United States Patent [19]

Fujiwara et al.

[11] Patent Number: 5,086,669
[45] Date of Patent: Feb. 11, 1992

[54] LINE PRESSURE CONTROLLER FOR AUTOMATIC TRANSMISSION

[75] Inventors: Takuji Fujiwara; Kohzo Ishii, both of Hiroshima, Japan

[73] Assignee: Mazda Motor Corporation, Hiroshima, Japan

[21] Appl. No.: 545,629

[22] Filed: Jun. 29, 1990

[30] Foreign Application Priority Data

Jun. 30, 1989 [JP] Japan .................. 1-170656

[51] Int. Cl.$^5$ .............................. B60K 41/06
[52] U.S. Cl. .................. 74/866; 192/109 F; 74/867
[58] Field of Search .......... 74/866, 867, 868, 869, 74/885, 890; 192/103 C, 109 F

[56] References Cited

U.S. PATENT DOCUMENTS

| | | | |
|---|---|---|---|
| 4,086,994 | 5/1978 | Hirosawa et al. | 192/109 F |
| 4,132,302 | 1/1979 | Chatterjea | 192/109 F X |
| 4,139,015 | 2/1979 | Sakai | 192/109 F X |
| 4,800,497 | 1/1989 | Koori et al. | 74/866 X |
| 4,836,055 | 6/1989 | Suzuki | 74/890 X |
| 4,890,515 | 1/1990 | Taniguchi et al. | 74/866 |
| 4,939,957 | 7/1990 | Asano et al. | 74/867 X |
| 4,955,256 | 9/1990 | Kashihara et al. | 74/867 X |

FOREIGN PATENT DOCUMENTS 49-30051 8/1974 Japan .

*Primary Examiner*—Dwight Diehl

[57] ABSTRACT

A line pressure controller deduces the completion of the speed change operation and sets the line pressure to a low level during the confirmation of the completion. If the acceleration is detected during the confirmation time period, the control device raises the line pressure up to an original level so as to prevent slip of the torque converter.

6 Claims, 8 Drawing Sheets

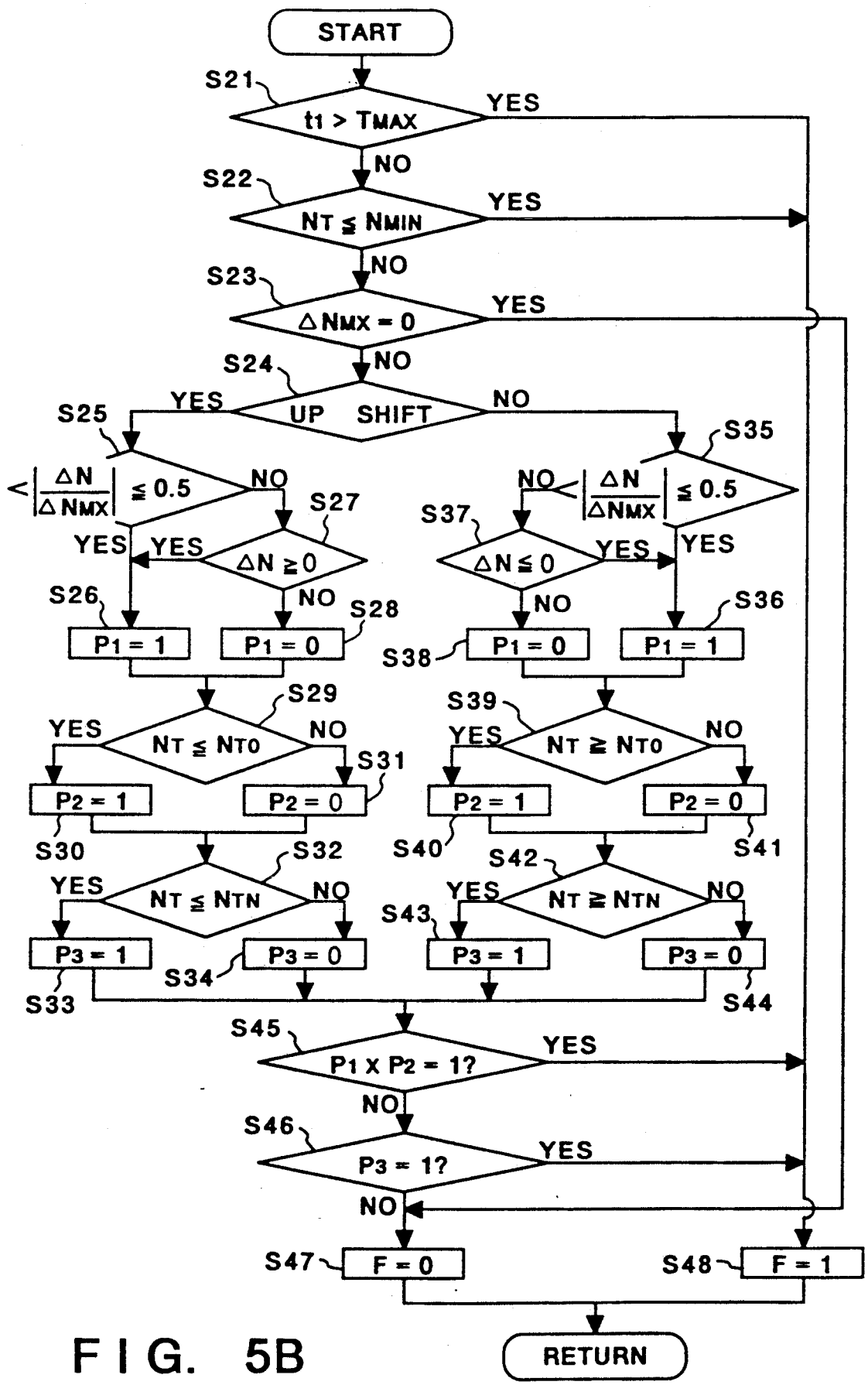
F I G. 5B

LINE PRESSURE CONTROLLER FOR AUTOMATIC TRANSMISSION

BACKGROUND OF THE INVENTION

The present invention relates to a line pressure controller for an automatic transmission for controlling the line pressure supplied so as to engage/disengage frictional engagement elements included in the automatic transmission.

An automatic transmission mounted on a vehicle comprises a torque converter, a speed change gear mechanism and a hydraulic pressure supply circuit for supplying hydraulic pressure to a plurality of frictional engagement elements such as clutches and brakes provided for the speed change gear mechanism. Thus, when the power transmission passages in the speed change gear mechanism selectively operates and switches the frictional engagement elements, a predetermined speed mode can be automatically obtained. A hydraulic pressure supply circuit is connected to the actuator of each of the above-described frictional engagement elements. The hydraulic pressure control circuit comprises a regulator valve for adjusting the discharge pressure from the oil pump to a predetermined line pressure, a manual valve for manually switching the range, a plurality of shift valves for selectively operating the plurality of frictional engagement elements by switching the hydraulic passage connected to the actuator of each of the frictional engagement elements, and variable valves for performing the auxiliary operations.

The line pressure to be supplied to each of the frictional engagement elements is set to the most suitable level in consideration of a variety of factors which will be described.

For example, the line pressure is set by the regulator valve to a level which corresponds to the output torque from the engine. Furthermore, since the engine output cannot be efficiently transmitted if the frictional engagement element encounters slip, the allowable line pressure level corresponding to the engine output torque is set in proportion to the output torque in order to prevent the slip of the frictional engagement element.

As disclosed in Japanese Patent Publication (Kokoku) No. 49-30051, the line pressure is lowered when the speed change operation performed by a driver is detected for the purpose of reducing the shock due to the speed change operation. The thus lowered pressure is restored to the original level after the speed change operation has been completed.

The time period in which the line pressure is lowered according to the structure disclosed in Japanese Patent Publication No. 49-30051 is arranged to be from the start of the speed change operation to the completion of the same. Specifically, it is arranged from the generation of the speed change command signal to a time after a predetermined period $T_0$ has elapsed from the making of the determination of the completion of the speed change operation. A line pressure during the term is determined in accordance with the engine output torque and turbine revolution.

As described above, according to the conventional structure, the line pressure is conducted in a fine manner for a certain time period for the purpose of preventing the shock due to the speed change operation.

However, a driver of a vehicle tends to perform the accelerating operation in accordance with the driving condition regardless of the speed change operation performed in the automatic transmission.

The accelerating pedal may be operated in the abovedescribed predetermined time period $T_0$ after the determination of the completion of the speed change operation to the time at which the line pressure has been restored. The above-described condition can be regarded to be that the speed change operation has been completed. However, according to the line pressure lowering control disclosed in Japanese Patent Publication No. 49-30051, the line pressure is lowered during the above-described time period $T_0$. Therefore, slip occurs in the frictional engagement element of the automatic transmission, causing a problem to arise in that the engine output cannot be properly transmitted to the wheels. At this time, although the driver operates the accelerating pedal by foot, a corresponding acceleration feeling cannot be obtained.

SUMMARY OF THE INVENTION

Accordingly, an object of the present invention is to provide a line pressure controller capable of preventing an acceleration loss due to slip of a frictional engagement element taken place in accordance with the line pressure control in the case where a speed change operation performed during the automatic speed change and the acceleration operation performed by a driver are simultaneously performed.

Another object of the present invention is to provide a control device for deducing the completion of the speed change operation so as to make a predetermined time period after the deduction has been made to be a completion confirmation term so that slip taken place in the converter is prevented by raising the line pressure if the acceleration is performed during the above-described completion confirmation period.

A further object of the present invention is to provide a control device capable of accurately determining the completion of the speed change operation which serves as the premise of the line pressure control.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 5A and 5B are flow charts which illustrate the control according to the present invention.

PREFERRED EMBODIMENTS OF THE INVENTION

An embodiment of the present invention will now be described with reference to the drawings.

Structure of a Control System

Figure 1:
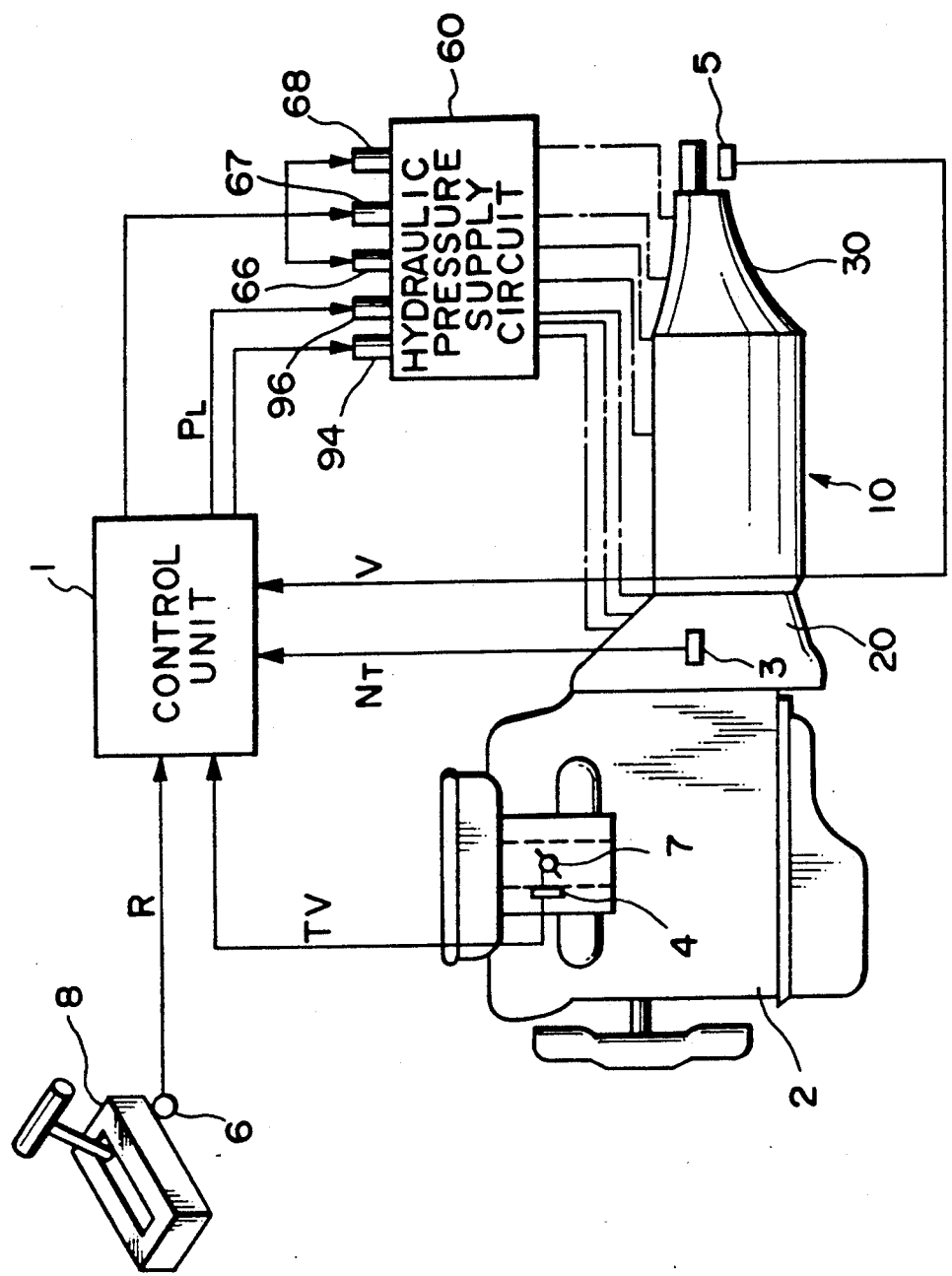
FIG. 1 is an overall structural view which illustrates a line pressure controller system for an automatic transmission to the present invention.

FIG. 1 is a block diagram which illustrates the structure of a system for controlling the line pressure to be supplied to an automatic transmission.

As shown in FIG. 1, the line pressure control system comprises: a control unit 1 serving as control means for controlling the line pressure at the time of gear transmission; a turbine-revolution sensor 3 for detecting the revolution of a turbine 23, to be described later, of a torque converter 20 included in an automatic transmission 10; a throttle opening degree sensor 4 serving as engine load detection means disposed in a suction passage connected to an engine 2 and acting to detect the opening degree of a throttle valve 7; a vehicle-speed sensor 5 disposed on the output shaft side of the automatic transmission 10 and acting to detect the vehicle speed; and an inhibitor switch 6 for detecting the position of a select lever 8 which switches the range of the automatic transmission 10, that is, detecting the range of the automatic transmission 10.

Figure 2:
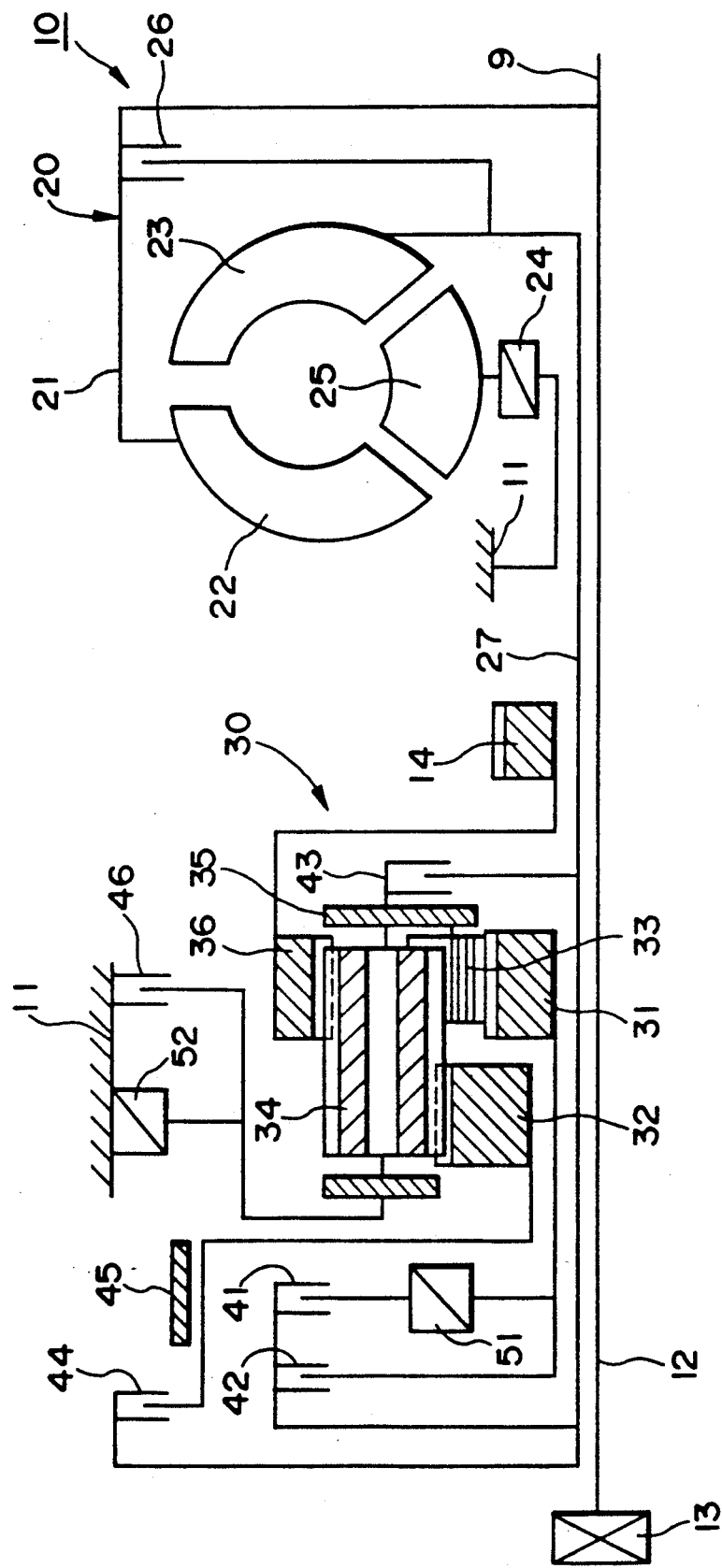
FIG. 2 is a schematic view which illustrates the mechanical the automatic transmission.

As shown in FIG. 2, the automatic transmission 10 comprises the torque converter 20 and a speed change gear mechanism 30 which is operated by the output from the torque converter 20. The speed change gear mechanism 30 comprises: a plurality of frictional engagement elements 41 through 46 such as clutches and brakes; and one-way clutches 51 and 52. As a result, running ranges D, 2, 1 and R can be obtained, the range D including first (low) through top speed, the range 2 including first (low) third speed and the range 1 including first (low) and second speed.

Automatic Transmission

Referring to FIG. 2, the automatic transmission 10 will be described in detail.

The torque converter 20 comprises: a pump 22 secured to the inside of a case 21 connected to an engine output shaft 9; the turbine 23 arranged to be operated by the pump 22 with hydraulic oil; a stator 25 disposed between the pump 22 and the turbine 23, supported by a transmission case 11 via a one-way clutch 24 and having a torque enlarging effect; and a lockup clutch 26 disposed between the case 21 and the turbine 23 and acting to establish a direct connection between an engine output shaft 9 and the turbine 23 via the case 21. The rotation of the turbine 23 is transmitted to the speed change gear mechanism 30 via a turbine shaft 27. A pump shaft 12 passing through the turbine shaft 27 is connected to the engine output shaft 9, the shaft 12 being arranged to operate an oil pump 13 supported at the rear end portion of the automatic transmission 10.

The speed change gear mechanism 30 comprises a labiniyo type planetary gear device. That is, the speed change gear mechanism 30 comprises: a small sun gear 31 fitted to a turbine shaft 27; a large sun gear 32 similarly fitted to the turbine shaft 27 behind the sun gear 31; a plurality of short pinion gears 33 engaged to the small sun gear 31; a long pinion gear 34 the front portion of which is engaged to the short pinion gear 33 and the rear portion of which is engaged to the large sun gear 32; a carrier 35 rotatably supporting the long pinion gear 34 and the short pinion gear 33; and a ring gear 36 engaged to the front portion of the long pinion gear 34.

A forward clutch 41 and a first one-way clutch 51 are, in series, disposed between the turbine shaft 27 and the small sun gear 31. Furthermore, a coast clutch 42 is positioned in parallel to the above-described clutches 41 and 51. A reverse clutch 44 is disposed between the turbine shaft 27 and the large sun gear 32. In addition, a 2-4 brake 47 which fixes the large sun gear 32 and which is constituted by a band brake is disposed between the large sun gear 32 and the reverse clutch 44. A 3-4 clutch 43 is disposed between the turbine shaft 27 and the carrier 35. A second one-way clutch 52, which receives the reaction of the carrier 35, and a low reverse brake 46, which fixes the carrier 35, are, in series, disposed between the carrier 35 of the 3-4 clutch 43 and the transmission case 11. The ring gear 36 is connected to an output gear 14 so that engine rotation is transmitted from the output gear 14 to right and left wheels (omitted from illustration) via a differential gear device.

Then, the relationship between the operation and the realized speed of the frictional engagement elements 41 and 46 such as the above-described clutches and the brakes and the one-way clutches 51 and 52 will be described.

As for the low speed, the forward clutch 41 is engaged and the first and the second one-way clutches 51 and 52 are locked. As a result, the output of the rotation from the torque converter 20 is transmitted from the turbine shaft 27 to the small sun gear 31 of the speed change gear mechanism 30 via the forward clutch 41 and the first one-way clutch 51. In this case, since the carrier 35 is secured by the action of the second one-way clutch 52, the speed change gear mechanism 30 acts as a fixed gear which does not perform the operation of transmitting the rotation from the small sun gear 31 to the ring gear 36 via the short pinion gear 33 and the long pinion gear 34. As a result, the low speed state of a large reduction ratio can be obtained, the low speed state corresponding to the ratio between the diameter of the small sun gear 31 and that of the ring gear 36.

As for the second speed, the forward clutch 41 is engaged and the first one-way clutch 51 is locked. Furthermore, the 2-4 brake 45 is engaged, the large sun gear 32 of the speed change gear mechanism 30 is fixed and the second one-way clutch 52 is allowed to idle. As a result, the rotation transmitted from the turbine shaft 27 to the small sun gear 31 is transmitted to the long pinion gear 34 via the short pinion gear 33. Furthermore, the long pinion gear 34 revolves around the large sun gear 32 since the large sun gear 32, which is arranged to be engaged to the long pinion gear 34, is fixed. Therefore, the carrier 35 is rotated. As a result, the rotational speed of the ring gear 36 is raised by the rotation of the carrier 35 (corresponding to the revolution of the long pinion gear 34) in comparison to the low speed. Therefore, the second speed, in which the reduction ratio is smaller than the low speed, can be obtained.

As for the third speed, the 2-4 brake 45 is released from a state of the second speed, and the 3-4 clutch 43 is simultaneously engaged. Therefore, the rotation of the turbine shaft 27 is transmitted to the small sun gear 31 via the forward clutch 41 and the first one-way clutch 51. Simultaneously, it is also transmitted to the carrier 35 via the 3-4 clutch 43. As a result, the third speed is obtained in which the overall body of the speed change gear mechanism 30 rotates and the ring gear 36 rotates at the same speed as that of the turbine shaft 27.

As for the top speed, the 2-4 brake 45 which has been temporarily released in the above-described third speed The relationships between the operation of the hydraulic engagement elements 41 and 46 and the one-way clutches 51 and 52 and the speed modes are as shown in Table 1.

TABLE 1

| RANGE | | CLUTCH | | | | BRAKE | | ONE-WAY CLUTCH | |
|---|---|---|---|---|---|---|---|---|---|
| | | FWD (41) | COAST (42) | 3-4 (43) | REV (44) | 2-4 (45) | LOW REV (46) | FIRST (51) | SECOND (52) |
| P | | | | | | | | | |
| R | | | | | o | | o | | |
| N | | | | | | | | | |
| D | 1st | o | | | | | | o* | o* |
|   | 2nd | o | | | | o | | o* | |
|   | 3rd | o | o | o | | | | o* | |
|   | 4th | o | | o | | o | | | |
| 2 | 1st | o | | | | | | o* | o* |
|   | 2nd | o | o | | | o | | o* | |
|   | 3rd | o | o | o | | | | o* | |
| 1 | 1st | o | o | | | | o | o* | o* |
|   | 2nd | o | o | | | o | | o* | |

Where, symbols * denote idling at the time of coasting.

is again connected. Therefore, the rotation of the turbine shaft 27 is transmitted from the 3-4 clutch 43 to the carrier 35 of the speed change gear mechanism 30 s that the long pinion gear 34 is revolved. Since the large sun gear 32 engaged to the long pinion gear 34 is fixed by the 2-4 brake 45, the long pinion gear 34 revolves together with the carrier 35 and rotates itself. As a result, the rotational speed of the ring gear 36 engaged to the long pinion gear 34 becomes raised by the rotation of the long pinion gear 34 in addition to the rotation of the carrier 35 (the rotation of the turbine shaft 27). Therefore, the top speed of the overdrive state can be obtained. In this case, although the forward clutch 41 has been engaged, the rotation of the turbine shaft 27 cannot be transmitted to the small sun gear 31 since the first one-way clutch 51, which is connected to the forward clutch 41 in series, is allowed to idle and the coast clutch 42 is disconnected.

In the reverse mode, the reverse clutch 44 and the low reverse brake 46 are connected, the rotation of the turbine shaft 27 is transmitted to the large sun gear 32 of the speed change gear mechanism 30 and the carrier 35 of the speed change gear mechanism 30 is fixed. Therefore, the rotation is transmitted through a gear line formed from the large sun gear 32 to the ring gear 36 via the long pinion gear 34. As a result, a reduction ratio which corresponds to the ratio between the diameter of the large sun gear 34 and that of the ring gear 36 can be obtained. In this case, the rotational direction of the ring gear 36 becomes opposite to the rotational direction of the turbine shaft 27 and that of the large sun gear 32. Therefore, the reverse mode can be obtained.

Since the first one-way clutch 51 which transmits the rotation at the time of the low to the third speed and the second one-way clutch 52 which receives the reaction at the low speed are allowed to idle at the time of the coasting, the engine brake is not operated at the above-described low to the third speed. However, the coast clutch 42 disposed in series to the first one-way clutch is connected to the same in the third speed in the D-range and the second and the third speed in the 2-range and the low and the second speed in the 1-range. Furthermore, the low reverse brake 46 disposed in parallel to the second one-way clutch 52 is connected to the same in the low speed in the 1-range. Therefore, the engine brake is able to act in the above-described speed modes.

Hydraulic Pressure Supply Circuit

Figure 3A:
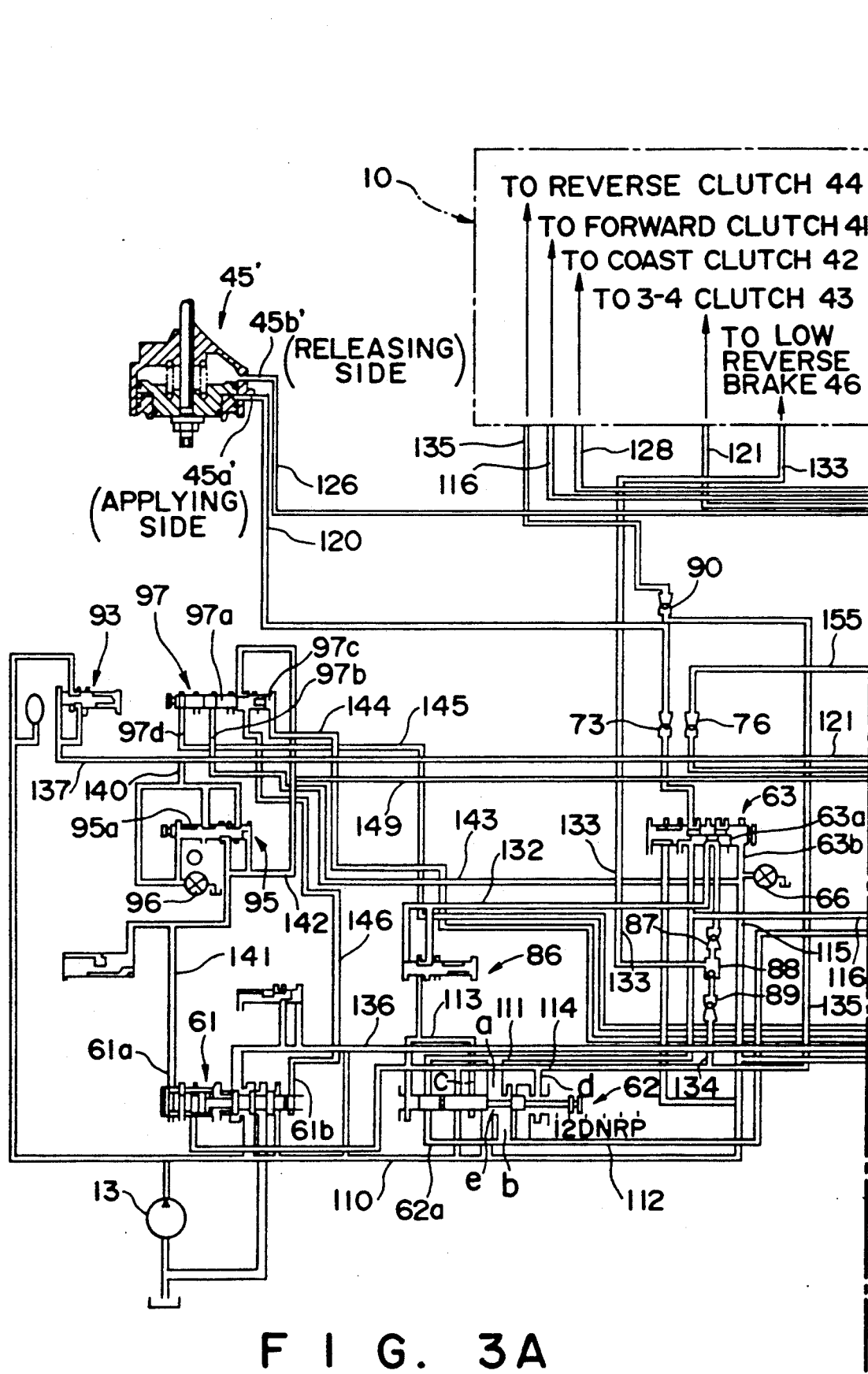
FIGS. 3A and 3B are circuit diagrams which illustrate a hydraulic pressure supply circuit for the automatic transmission.
Figure 3B:
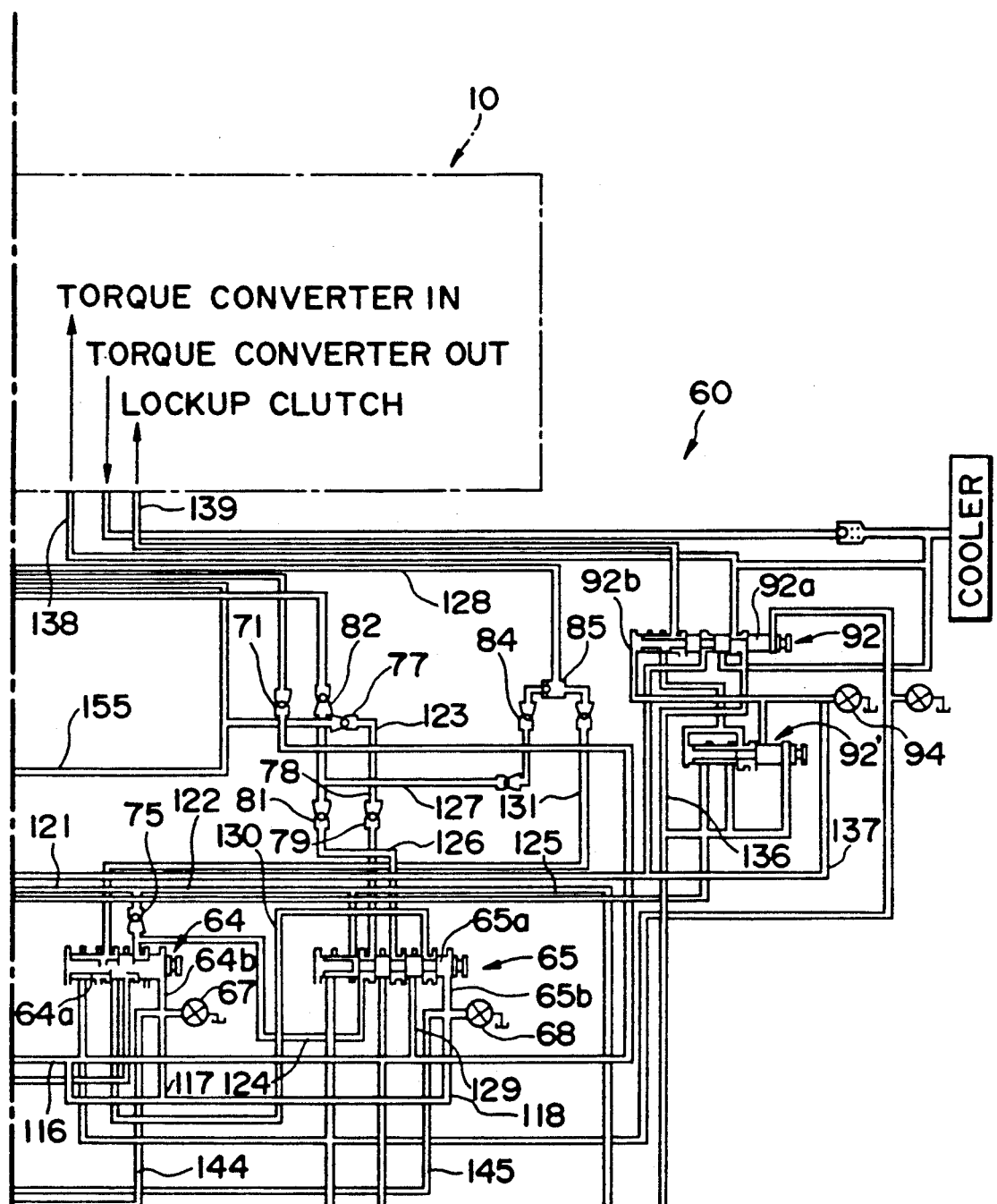

The automatic transmission 10 comprises a hydraulic supply circuit 60 shown in FIGS. 3A and 3B.

Referring to FIGS. 3A and 3B, a hydraulic actuator 45' for the 2-4 brake 45 comprises a servo piston having an apply port 45a' and a release port 45b'. When hydraulic pressure is supplied to the apply port 45a', the 2-4 brake 45 is connected. When hydraulic pressure is not supplied to both ports 45a' and 45b' or when hydraulic pressure is supplied to both ports 45a' and 45b', the 2-4 brake 45 is arranged to be disengaged. Each of actuators for the other frictional engagement elements 41 through 44 and 46 comprises an ordinary hydraulic piston which is arranged to connect the frictional engagement element when hydraulic pressure is supplied.

The hydraulic pressure supply circuit 60 mainly comprises: a regulator valve 61 for adjusting the pressure of hydraulic oil discharged from the oil pump 13 (also see FIG. 1) to a main line 110 to a predetermined level; a manual valve 62 for manually selecting the range; and shift valves 63, 64 and 65 for realizing shifts 1-2, 2-3 and 3-4 by supplying/discharging hydraulic pressure to each of the frictional engagement elements (actuators) 41 through 46 in accordance with the speed mode.

The manual valve 62 comprises an input port e into which the line pressure is introduced from the main line 110; and first through fourth output ports a through d. When a spool 62a has been moved, the input port e is connected to the first and the second output ports a and b in the D-range and the 2-range. It is connected to the first and the third output ports a and c in the 1-range, while it is connected to the fourth output port d in the R-range. First through fourth output lines 111 to 114 are respectively connected to the output ports a through d.

The 1-2, 2-3 and 3-4 shift valves 63, 64 and 65 are respectively arranged so as to be urged, by springs (omitted from illustration), to the right when viewed in the drawing. Furthermore, pilot ports 63b, 64b and 65b are disposed on the right of the corresponding spools 63a, 64a and 65a. A first pilot line 115 extending from the main line 110 is connected to the pilot port 63b of the 1-2 shift valve 63. Furthermore, second and third pilot lines 117 and 118 branched from the first output line 111 via a line 116 are connected to the pilot ports 64b and 65b of the 2-3 and 3-4 shift valves 64 and 65. The pilot lines 115, 117 and 118 are respectively provided with a first, second and third solenoid valves 66, 67 and 68. When the above-described solenoid valves 66 through 68 are turned on, they drain the pilot lines 115, 117 and 118 so that the pilot pressure in the pilot ports 63b to 65b of the corresponding shift valves 63 through 65 are discharged. As a result, the spools 63a to 65a are positioned on the right side when viewed in the drawing. On the other hand, when the solenoid valves 66 through 68 are turned off, pilot pressure is introduced from the pilot lines 115, 117 and 118 to the pilot ports 63b through 65b so that the spools 63a to 65a are positioned on the left side when viewed in the drawing.

The above-described solenoid valves 66 to 68 are arranged to be turned on/off in response to a signal to be supplied from a control unit 1 in accordance with a predetermined map which has been formed in accordance with vehicle speed V and engine throttle opening degree TV, the control unit 1 being described later. In accordance with the turning on/off operation of the solenoid valves 66 through 68, the positions of the spools 63a through 65a of the shift valves 63 through 65 are shifted so that the oil passages communicated with the frictional engagement elements 41 to 46 are switched. As a result, the connections of the frictional engagement elements 41 through 46 are established in accordance with the combinations shown in Table 1 so that the speed mode can be switched in accordance with the state of the vehicle operation. The relationship between each of the speed mode and the state of turning on/off of the solenoid valves 66 through 68 is determined as shown in Table 2. When the speed mode is lowered from the third to the second speed mode, the shifting operation is arranged to pass through the intermediate pattern shown in the same table.

TABLE 2

|   |   | First Solenoid Valve (66) | Second Solenoid Valve (67) | Third Solenoid Valve (68) |
|---|---|---|---|---|
| D | 1 | OFF | ON | ON |
|   | 2 | ON | ON | ON |
|   | Intermediate* | ON | ON | OFF |
|   | 3 | ON | OFF | OFF |
|   | 4 | ON | OFF | ON |
| 2 | 1 | OFF | ON | ON |
|   | 2 | ON | ON | OFF |
|   | 3 | ON | OFF | OFF |
| 1 | 1 | OFF | ON | OFF |
|   | 2 | ON | ON | OFF |

*for 3–2 shift down

The line 116 is branched from the first output line 111 of the first to the fourth output lines 111 to 114 connected to the output ports a through d in the manual valve 62, the first output line 111 being communicated with the main line 110 in each of the forward ranges D, 2 and 1. The line 116 is arranged to be a forward clutch line to be communicated with the forward clutch 41 via a one-way orifice 71. Therefore, it can be understood that the forward clutch 41 is always connected in each of the D, 1 and 2 ranges.

The first output line 111 is communicated with the 1-2 shift valve 63, the first output line 111 being communicated with a servo apply line 120 and further communicated with the apply port 45a' of the servo piston 45 via a one-way orifice 73 when the spool 63a has been shifted to the right when the first solenoid 66 has been turned on. Therefore, when the first solenoid valve 66 is turned on in either the D, 2 or 1 range, that is, at either the second, the third or the top speed in the D-range or at the second speed in the 1-range, hydraulic pressure (servo apply pressure) is supplied to the apply port 45a'. If no hydraulic pressure (servo release pressure) is supplied to the release port 45b' in this state, the 2-4 brake 45 is connected.

In the D and 2-ranges, the second output line 112 communicated with the main line 110 is communicated with the 2-3 shift valve 64. The second output line 112 is arranged to be communicated with the 3-4 clutch line 121 via a one-way orifice 75 when the second solenoid valve 67 is turned off and the spool 64a is thereby positioned on the left side. The 3-4 clutch line 121 is connected to the 3-4 clutch 43 via line 155 and a a one-way orifice 76. Therefore, when the second solenoid valve 67 is turned off in the D or the 2-range, that is at the third speed or the top speed mode in the D-range and at the third speed mode in the 2-range, the 3-4 clutch 43 is connected.

First and second drain lines 122 and 123 are branched from the 3-4 clutch line 121, the first drain line 122 being connected to the 3-4 shift valve 65. The first drain line 122 is further connected to the line 124 when the third solenoid valve 68 is turned off (when the spool 65a is positioned on the left side), and the first drain line 122 being further connected to the drain port of the 2-3 shift valve 64. The second drain line 123 is also communicated with the 3-4 shift valve 65 via a one-way orifice 77, a fixed orifice 78 and a one-way orifice 79. The second drain line 123 is further communicated with the line 124 when the third solenoid valve 68 si turned on (when the spool 65a is positioned on the right side), the second drain line 123 being further connected to the drain port of the 2-3 shift valve 64.

That is, at the 3-2 shift down operation f the 3-2 shift down operation and the 4-2 shift down operation in which hydraulic pressure (3-4 clutch pressure) is discharged from the 3-4 clutch 43, 3-4 clutch pressure is discharged through the first drain line 122, the 3-2 shift down operation being the operation the process of which passes through the intermediate pattern in which the third solenoid valve 68 shown in Table 2, becomes a turned-off state. Furthermore, at the 4-2 shift down operation in which the turning-on state of the third solenoid valve 68 is maintained, 3-4 clutch pressure is discharged from the second drain line 123.

A line 125 connected to the first drain line 122 is, similarly to the 3-4 clutch line 121, communicated with the second output line 112 when the second solenoid valve 67 has been turned off and when the spool 64a of the 2-3 shift valve 64 is positioned on the left side. The line 125 is communicated with the 3-4 shift valve 65, and is arranged to be communicated with a servo release line 126 when the third solenoid valve 68 has been turned off and when the spool 65a is positioned on the left side. The servo release line 126 reaches the release port 45b' of the servo piston 45' via one-way orifices 81 and 82. Therefore, when both the second and the third solenoid valves 67 and 68 have been turned off at the D or 2-range, that is, at the third speed mode in the D-range or the third speed mode in the 2-range, the servo release pressure is supplied to the release port 45b' of the servo piston 45b° so that the 2-4 brake 45 is released.

A line 127 branched from between the two one-way orifices 81 and 82 of the servo release line 126 is communicated with a coast clutch line 128 via a one-way orifice 84 and a ball valve 85, and reaches the coast clutch 42. Therefore, the coast clutch 42 is connected at the third speed mode in the D-range and the third speed mode in the 2-range in which hydraulic pressure is introduced into the servo release line 126.

On the other hand, when the third solenoid valve 68 has been turned off and the spool 65a of the 3-4 shift valve 65 is thereby positioned on the left side and when the second solenoid valve 67 has been turned on and the spool 64a of the 2-3 shift valve 64 is thereby positioned on the right side, the forward clutch line 116 is communicated with a line 131 via a branch line 129, the 3-4 shift valve 65, a line 130 and the 2-3 shift valve 64. The line 131 is further communicated with the coast clutch line 128 via the ball valve 85. Therefore, the coast clutch 42 is also connected when the second solenoid valve 67 has been turned on and when the third solenoid valve 68 has been turned off, that is, at the second speed mode in the 2-range or the low or the second speed mode in the 1-range.

A third output line 113 communicated with the main line 110 by the manual valve 62 at the 1-range is communicated with the 1-2 shift valve 63 via a low reducing valve 86, which serves as a pressure-reducing valve, and a line 132. The line 132 is communicated with a low-reverse brake line 133 via a one-way orifice 87 and a ball valve 88 when the first solenoid valve has been turned off and the spool 63a is thereby positioned on the left side, the line 132 being further arranged to reach a low-reverse brake 46. Therefore, when the first solenoid valve 63 has been turned off in the 1-range, that is, at the low speed in the 1-range, the low-reverse brake 46 is connected.

The fourth output line 114, which is communicated with the main line 110 in the R-range, is communicated with the low-reverse brake line 133 via a line 134 branched from the fourth output line 114, a one-way orifice 89 and the ball valve 88. The fourth output line 114 then serves as a reverse clutch line 135 which reaches the revere clutch 44 via a one-way orifice 90. Therefore, the low-reverse brake 46 and the reverse clutch 44 are always connected in the R-range.

The hydraulic pressure supply circuit 60 is provided with a lockup shift valve 92 which operates a lockup clutch 26 in the torque converter 20 shown in FIG. 2. A torque converter line 136 extended from the regulator valve 61 via a line 149 is communicated with the lockup shift valve 92. The lockup shift valve 92 has, at an end portion thereof, a pilot port 92b to which a pilot line 137 is connected. The pilot line 137 is arranged to be supplied with hydraulic pressure which is branched from the main line 110 and the level of which has been reduced by the solenoid reducing valve 93.

A fourth solenoid valve 94 for the locking-up operation is provided for the line 137. As a result, when a spool 92a is positioned on the right side in a state where the fourth solenoid valve 94 has been turned off, the torque converter line 136 is communicated with a torque converter line 138 which is connected to the torque converter 20. As a result, the internal pressure of the torque converter 20 is raised so that the lockup clutch 26 is connected. When the solenoid valve 94 has been turned on and the spool 92a has thereby been shifted to the left side, the torque converter line 136 is communicated with a lockup release line 139 via a lockup control valve 92'. As a result, lockup releasing pressure is supplied to the torque converter 20 so that the lockup clutch 26 is released.

Generation of Line Pressure

The hydraulic pressure supply circuit 60 comprises a throttle modulator valve 95 for controlling the line pressure which is adjusted by the regulator valve 61, a duty solenoid valve 96 of an electromagnetic type which controls the line pressure which serves as the power source for the throttle modulator valve 95 and a cutback valve 97.

A line 140, branched from a line 137 communicated with the main line 110 via the solenoid reducing valve 93, is communicated with the throttle modulator valve 95. Since pilot pressure which has been adjusted by the duty solenoid valve 96 which cyclically opens/closes is introduced into an end portion of a spool 95a, the valve 95 is able to generate throttle modulator pressure the level of which corresponds to the duty ratio (the time period ratio in which the valve is opened in one cycle) of the duty solenoid valve 96.

In this case, the duty ratio of the valve 96 is determined in accordance with the throttle opening degree TV of the engine. Since the throttle modulator pressure corresponding to the thus determined duty ratio is introduced into a pressure raising port 61a of the regulator valve 61 through a line 141, the line pressure, which is adjusted by the valve 61, is raised in accordance with the enlargement of the throttle opening degree of the engine.

A line 142, branched from the line 141 which supplies the throttle modulator pressure to the regulator valve 61, is communicated with the cutback valve 97, the cutback valve 97 being provided with first, second and third ports 97b, 97c and 97d. The first port 97b is arranged to be supplied, via a line 143, with pilot pressure which is generated when the first solenoid valve 66 is turned off. The second port 97c is arranged to be supplied, via a line 144, with pilot pressure which is generated when the second solenoid valve 67 is turned off. The third port 97d is arranged to be supplied, via a line 145, with pilot pressure which is generated when the third solenoid valve 68 is turned off.

In accordance with the state of introduction of the above-described pilot pressure, the spool 97a is moved in such a manner that the line 142 is disconnected at the low speed in the D-range or the low speed in the 2-range in which the pilot pressure is introduced into only the first port 97b (only the first solenoid valve 66 is turned off), first and the third ports 97b and 97d (the first and the third solenoid valves 66 and 68 are turned off). The line 42 is also disconnected at the second speed in the 2-range pressure is introduced into only the third port 97d (when only the third solenoid valve 68 is turned off). In the other speed modes, the line 142 is communicated with a line 146 so that the throttle modulator pressure is introduced into a pressure reduction port 61b of the regulator valve 61, causing the line pressure to be lowered.

The control unit 1 stores a map relating to the vehicle speed V and the shift pattern (to be called "an SP" hereinafter) which has been previously determined by the throttle opening degree TV. Thus, the control unit 1 collates the vehicle speed V and the throttle opening degree TV respectively detected by the vehicle speed sensor 5 and the throttle opening degree sensor 4 with the above-described map. As a result, in accordance with the speed change operation, it causes the first, second and third solenoid valves 66, 67, 68 to be opened/closed as shown in Table 2.

Schematic Description of the Line Pressure Control

The control unit 1 controls the duty solenoid valve 96 at the time of speed change in such a manner that the line pressure is lowered in order to reduce the magnitude of the shock taken place at the time of the speed change operation. According to this embodiment, two control modes as shown in FIGS. 4A and 4B are prepared as the control modes for lowering the line pressure so as to be selected depending upon whether or not a driver has performed an accelerating operation during the execution of the line pressure reduction control for reducing the shock due to the speed change operation.

Figure 4A:
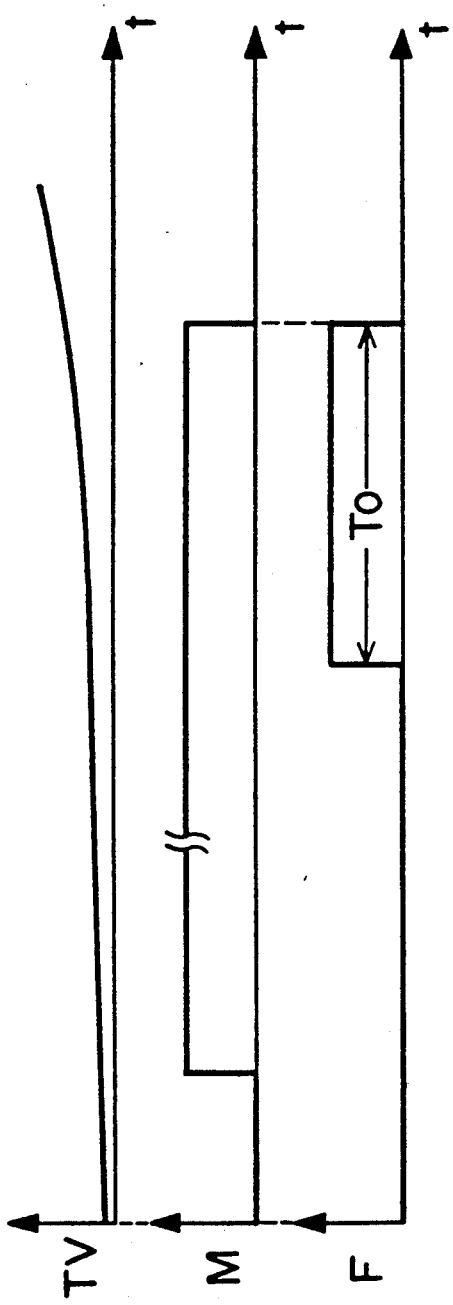
FIGS. 4A and 4B are timing charts which illustrate the operation of the line pressure controller according to the present invention.

FIG. 4A illustrates an example of the control operation in the case where a driver has not performed the accelerating operation. That is, the time period in which the line pressure is reduced is arranged to be started at which the speed change operation starts, causing a speed change command signal to be generated and to be ended after a lapse of predetermined time period ($T_0$) after the completion of the speed change operation has been determined. Referring to FIG. 4A, flag M (=1), showing that the control for reducing the line pressure is performed, is set at the time when the speed change operation is started, at which the speed change command signal is generated. Then, the control, in which the line pressure is reduced, is continued for time period To from the time at which flag F, showing that the completion of the speed change operation has been determined, has been set, the time period To being taken in consideration of an error in the determination of the completion of the speed change operation. Namely, M=1 is maintained. After a lapse of time To, the flags M and F are reset s that the control, in which the line pressure is reduced, is completed. As a result, the shock, which can be generated at the time of the speed change operation, can be prevented.

Figure 4B:
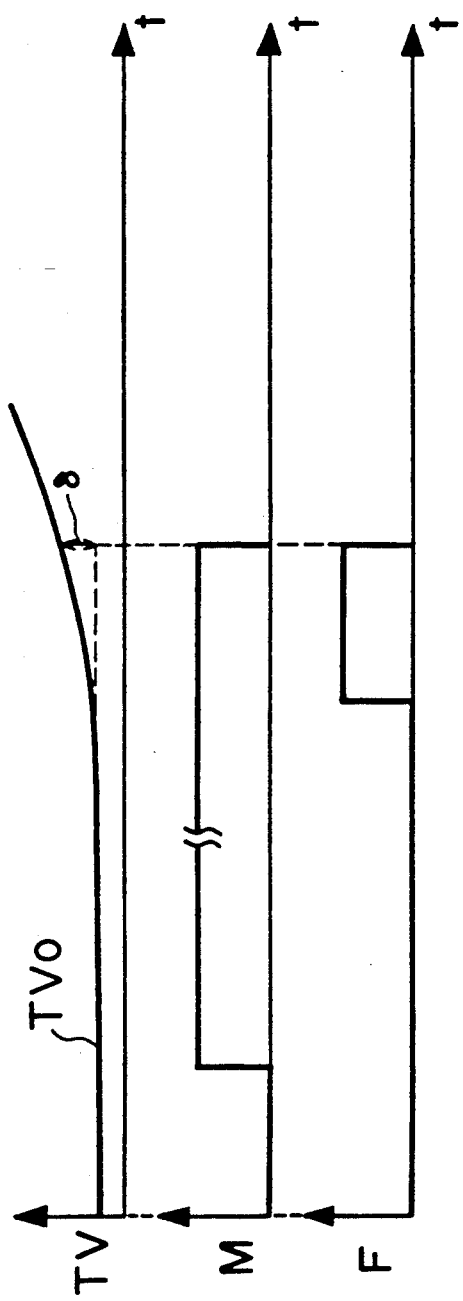

FIG. 4B illustrates a case in which a driver has performed the accelerating operation during the execution of the line pressure reduction control. Referring to the drawing, the control in which the line pressure is lowered is cancelled when the accelerator pedal has been operated by the driver and the throttle opening degree sensor 4 has detected that the throttle opening degree TV has exceeded throttle opening degree $TV_0$ detected at the speed change operation start by a predetermined value ⊕ ($TV - TV_0 > 0$) at the time in which the line pressure has been reduced (M = 1) during a time period between the speed change operation completion determined time (the time at which F = 1 has been realized) to the time at which the line pressure is restored (a lapse of time period $T_0$). Namely, the duty solenoid valve 96 is controlled in such a manner that the flags M and F are forcibly reset so as to restore the line pressure.

Figure 5A:
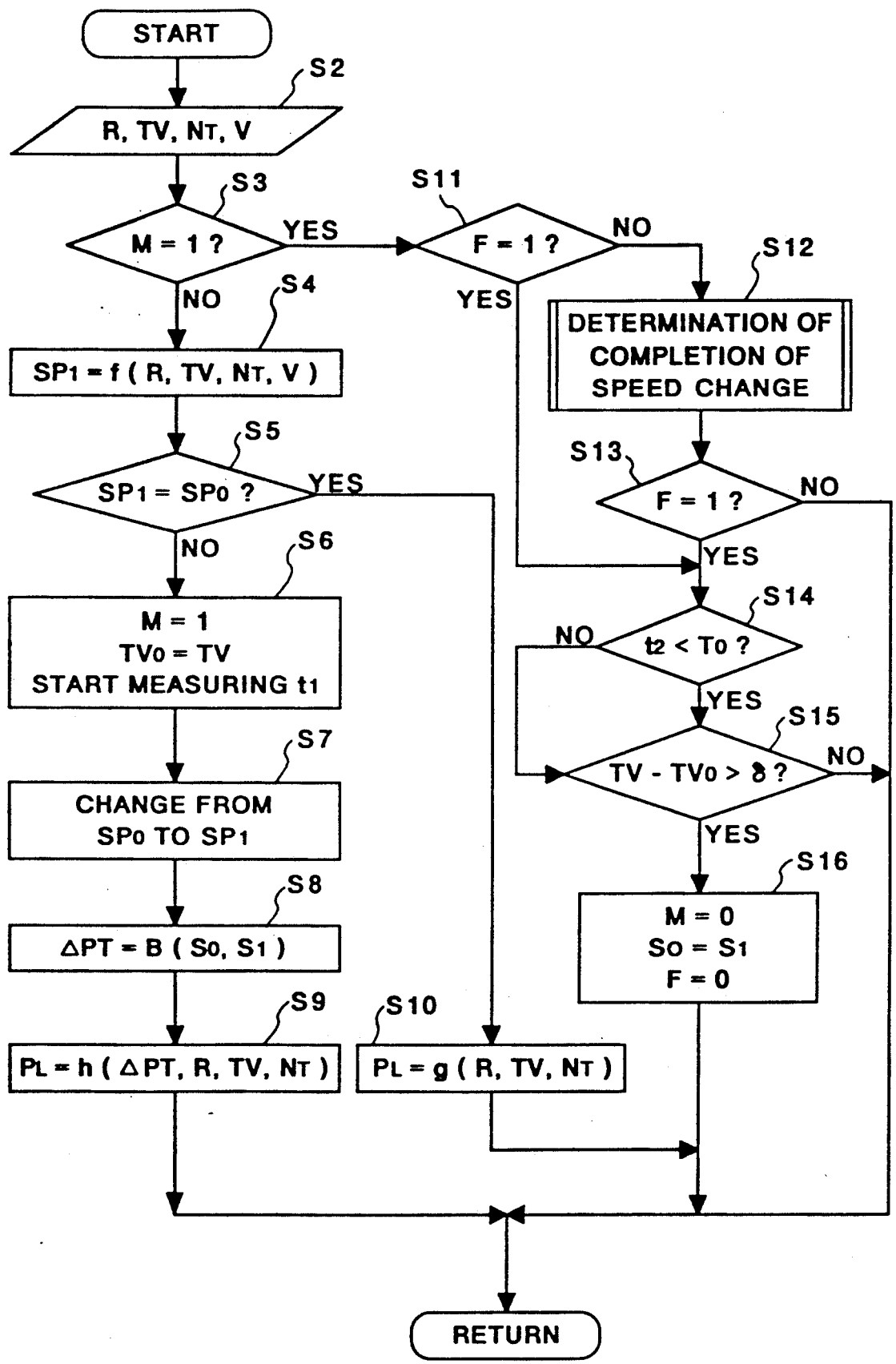

A control program for performing the operation control shown in FIGS. 4A and 4B is shown in FIG. 5A.

The determination of the completion of the speed change operation is conducted in accordance with the control procedure shown in FIG. 5B. Then, the outline of the speed change operation completion determination will be described.

According to this embodiment, it is deduced that the speed change operation has been completed if any of the following three conditions is satisfied ① When time taken to complete the speed change operation exceeded a predetermined time period $T_{MAX}$ ② When the turbine revolution $N_T$ has become smaller than a certain threshold revolution $N_{MIN}$ ③ When the turbine revolution $N_T$ has entered a certain range (determination range)

Then, the third condition will be described with reference to FIGS. 6A and 6B.

Figure 6A:
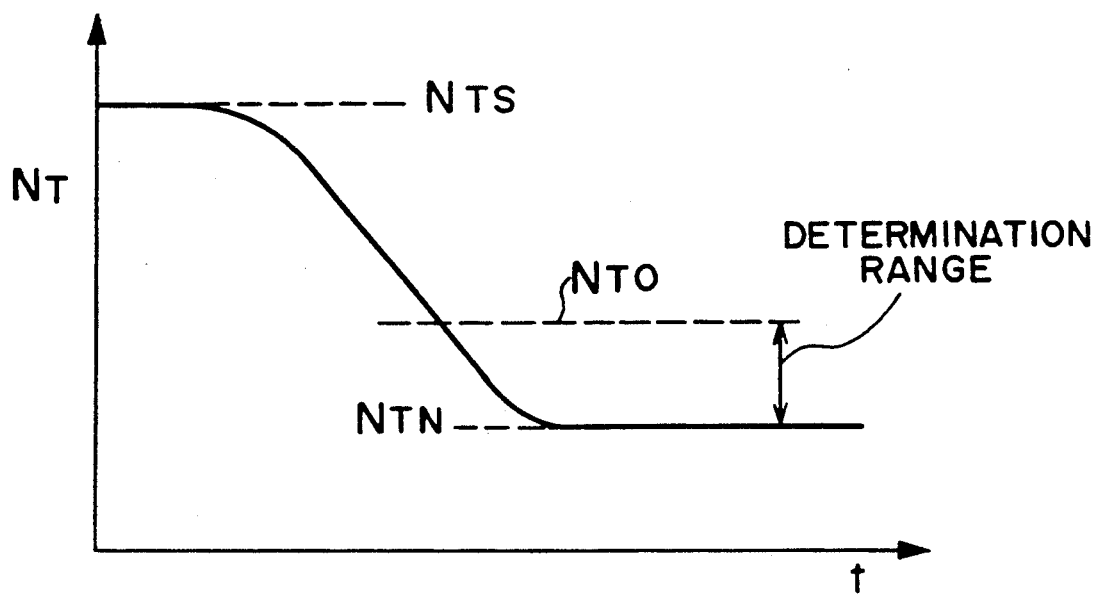
FIGS. 6A and 6B are timing charts which illustrate the deduction of the completion of the speed change operation.
Figure 6B:
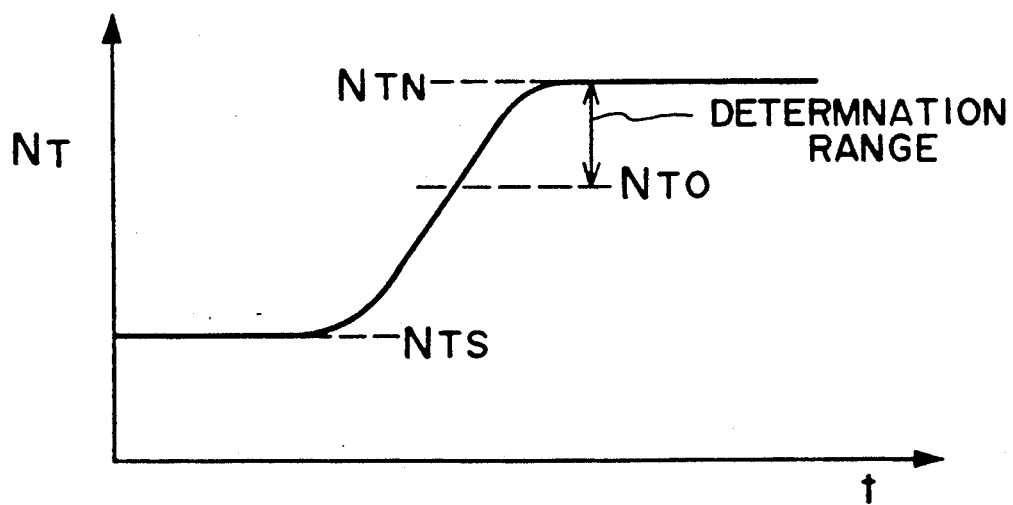

In the up-shift speed change shown in FIG. 6A and in the down-shift speed change shown in FIG. 6B, it is assumed that the turbine revolution, at the time of the speed change operation start at which the speed change command has been issued, is NTS and the predicted completion turbine revolution at the time of the completion of the speed change operation is NTN. Since the gear ratio has been determined depending upon the type of the speed change operation, the predicted completion turbine revolution NTN can be obtained by a calculation from the turbine revolution NTS at the time of the speed change operation start. Theoretically, the turbine revolution is lowered from NTS and is converged to NTN at the time of the up shift operation, while the same is raised from NTS and is converged to NTN at the time of the down shift operation. However, it is not correct that the completion of the speed change operation is determined when NT has reached the prediction completion turbine revolution NTN since the turbine revolution NT changes during the speed change operation. Therefore, the critical value NTO of the turbine revolution NT with which the speed change operation has been completed is defined by the following equation:

$$\text{NTO} = \text{NTN} + 0.25(\text{NTS} - \text{NTN}) \quad (1)$$

A relationship NTS > NTN holds at the up shift operation, while a relationship NTS < NTNN holds at the down shift operation. According to the description about the present invention, the ranges defined by the following Equations (2) and (3) are called "determination ranges". It is arranged that the completion of the speed change operation is determined when the turbine revolution NT is between the critical value NTO and the prediction completion turbine revolution NTN. That is, if NT reaches in the following range at the time of the up shift operation, the completion of the speed change operation is determined:

$$\text{NTN} < \text{NT} \leq \text{NTO} \quad (2)$$

If NT reaches in the following range at the time of the shift down operation, the completion of the speed change operation is determined:

$$\text{NTO} \leq \text{NT} < \text{NTN} \quad (3)$$

If it is determined that the turbine revolution NR is included in the above-described determination range, it is determined whether or not the change ratio ΔN of the turbine revolution NT meets "a determination condition". The "determination condition" is as follows assuming that the maximum value of the change ratio ΔN is ΔMAX:

$$④ \quad \left| \frac{\Delta N}{\Delta N_{MX}} \right| \leq 0.5 \quad (4)$$

or

-continued $$⑤ \quad \left|\frac{\Delta N}{\Delta N_{MX}}\right| > 0.5 \quad (5)$$

simultaneously $$\Delta N \geq 0 \text{ (for the shift up operation)} \quad (6)$$

or $\Delta N \leq 0$ (for the shift down operation)  (7)

The above-described ΔNMX is the change ratio in NT when the turbine revolution ΔN has been considerably changed at the initial stage of the speed change operation referring to FIGS. 6A and 6B. Therefore, Equation (4) means that the change ratio ΔN of the turbine revolution has been reduced. That is, the fact that Equation (4) is satisfied means that the speed change operation has been completed and the turbine revolution has been converged.

Then, the above-described condition ⑤ will be described. Equation (5) means that the turbine revolution NT has been considerably changed. Furthermore, the fact that both Equations (5) and (6) are simultaneously satisfied means that the turbine revolution NT has been shifted from the lowering tendency to a stable convergence at the shift up operation. The fact that both Equations (5) and (7) are simultaneously satisfied means that the turbine revolution NT has been shifted from the rising tendency to the stable convergence at the shift down operation. In either of the above-described cases, it means that the turbine revolution NT has been converged due to the completion of the speed change operation. The time at which Equations (5), (6) and (7) are satisfied becomes evidence for the deduction of the speed change operation.

Control Procedure

Then, the control operation performed by the control unit 1 constituted as described above will be described with reference to the flow charts shown in FIGS. 5A and 5B. The control procedure to be described with reference to the flow charts is a portion relating to this embodiment picked up from the overall control procedure performed by the controller 1. Therefore, the controller 1 contains the control procedure (omitted from illustration) in addition to the flow charts shown in FIGS. 5A and 5B.

In step S2 shown in FIG. 5A, there is a read out of the present range R which may be any of the parking (P) range, reverse (R) range, neutral range (N), drive (D) range, 2-range or 1-range Furthermore, the throttle opening degree TV supplied from the throttle opening degree sensor 4, the turbine revolution NT supplied from the turbine revolution sensor 3 and the vehicle speed V supplied from the vehicle speed sensor 5 are read out. Then, in step S3, the flag M is checked so as to check the fact whether or not the speed change operation is being performed (M=1).

Then, a description will be made about a case in which the speed change operation is not being performed (M=0) and simultaneously the drive condition is not changed considerably as when the speed change operation is performed.

Since a relationship M=0 is held in the above-described case, the flow advances to step S4. In step S4, an ON/OFF pattern SP1 of the first through third solenoid valves 66, 67 to 68 is retrieved from a map storing the shift patterns stored in the memory, the ON/OFF pattern SP1 being the pattern which suits the drive condition represented by data: the range R, the turbine revolution NT, the throttle opening degree TV and the vehicle speed V which have been obtained in Step S2. Since the shift pattern SP1 is complicatedly changed depending upon R, TV, V and the like, SP1 is expressed by SP1=f (R, TV, NT, V) in FIG. 5A.

Then, in step S5, a comparison is made for the purpose of determining whether or not there is a change, the comparison being made between the present shift pattern SP1 (the ON/OFF pattern of the first through third solenoid valves 66, 67, 68) and the shift pattern SP1 obtained in step S4. If it is determined that SP0 is different from SP1, the speed change operation is necessary. If they are the same, the speed change operation is not necessary. Therefore, if it is determined in step S5 that

SP1=SP0, the flow advances to step S10 in which the line pressure PL is determined in accordance with the following equation:

$$PL = g (R, TV, NT) \quad (8)$$

where the signal PL is a duty control signal for the duty solenoid 96, PL being a properline pressure when the speed change operation is not being performed.

Start of Speed Change Operation

Then, a case in which the speed change operation is started will be described.

Since the relationship M=O is held in this case, the flow advances to step S4 in which shift pattern SP1 to be determined form this time is retrieved. Then, in step S5, a comparison is made for the purpose of determining whether or not there is a change, the comparison being made between the present shift pattern SP0 and the shift pattern SP1 to be determined form this time.

If it is determined in step S5 that

SP1≠SP0 the flow advances to step S6 in which the flag M is set M= 1 (during the speed change operation). Furthermore, the present throttle opening degree TV (which has been read in step S2) is stored as TV₀ which is one detected at the start of the speed change operation. In step S6, the counting up operation of a timer T1, which supervises a lapse of time form the speed change operation start, is started. In step S7, the present ON/OFF pattern SP0 of the solenoid valves 66 through 68 is set to the pattern SP1 to be determined from this time for the purpose of starting the speed change operation. Then, in step S8, change ΔPT in the speed change pattern from the pattern SP0 to the pattern SP1, for example, from the low speed to the second speed is detected. In step S9, the line pressure PL during the speed change operation, that is, the line pressure PL which is the pressure reduced during the speed change operation is obtained from the change ΔPT of the speed change pattern, the range R, the throttle opening degree TV and the turbine revolution NT in accordance with the following equation:

$$PL = h (\Delta PT, R, TV, NT) \quad (9)$$

Symbol PL (the line pressure during the speed change operation) shown in Equation (9) takes values which reduce the line pressure in comparison to PL (the line pressure during non-speed change operation) shown in Equation (8) for the purpose of preventing the shock due to the speed change operation. The reason for the fact that Equation (9) includes ΔPT lies in the fact that the number of the hydraulic actuators, included in the hydraulic pressure control circuit (see FIGS. 3A and 3B) the ON/OFF state of which is changed, differs depending upon the variation of the speed change operation.

Thus, the speed change operation is started so that each of the hydraulic actuators starts the ON/OFF operation.

During the Speed Change Operation

Then, the control procedure when the speed change operation is being performed (M=1) will be described.

In this case, the flow advances from step S3 to step S11. Flag F in step S11 shows the fact that the completion of the speed change operation is deduced from the turbine revolution NT or the like, the Flag F being set in step S12 (as for details, see FIG. 5B). Since no determination of the completion has been made at this time, the flow advances from step S11 to step S12 in which the determination of the completion of the speed change operation is made. The result of the determination is reserved in the flag F so as to be checked in step S13. Since the speed change operation cannot be ended immediately, it is expected that the relationship F=0 is held at the first determination made in step S12. Therefore, the flow returns from step S13 to the main routine.

The conditions, with which the speed change operation is completed and which are described with reference to Equations (1) to (6), are satisfied. Then, the flag F is set to "1" in step S12.

As a result, the flow advances from step S11 to step S14 via steps S12 and S13.

In step S14, a comparison is made between a time lapse t2 from the time at which the deduction of the completion of the speed change operation is made in the speed change operation completion determination routine in step S12 and a predetermined time period $T_0$ (see FIG. 4). Since the determination of the completion of the speed change operation made in step S12 is the deduction performed on the basis of the turbine revolution NT, the final determination is made after the lapse of time period 0 in order to improve the determination accuracy. Therefore, the flow advances from step S14 to step S15 before the time period $T_0$ is not elapsed.

As described with reference to FIG. 4B, the driver may perform the acceleration by operating the accelerator pedal during the above-described time $T_0$. In step S15, the operation of the accelerator pedal is detected.

If the throttle opening degree TV read in step S2 and the opening degree stored in step S6 hold the following relationship:

$$TV - TV0 \leq \delta \qquad (10)$$

the acceleration operation is not performed by the driver. Therefore, it is preferable that a control be conducted in which the prevention of the shock due to the speed change operation is mainly intended by maintaining the present pilot pressure P (set in step S8). Therefore, the flow returns from step S15 to the main routine.

If the accelerating operation is not performed, the time lapse t2 is elapsed to become t2 T, causing a determination to be made in which the speed change operation has been finally normally ended. Therefore, the flags M and F are reset in step S16 and the speed change pattern SP1 which has been the aimed pattern is changed to the present pattern SP0.

Acceleration Performed During the Speed Change Operation

Then, a case in which the acceleration operation is performed during the speed change operation will be described. If the following determination is made in step S15, it is determined that the acceleration operation has been performed:

$$TV - TV0 \leq \delta \qquad (11)$$

Therefore, the flow advances to step S16 in which the flags M and F are reset and the following setting is made:

SP0=SP1

When the flag M has been reset in step S16, the flow advances from step S3 to step S5 via step S4. Since the relationship SP0=SP1 has been forcibly held in step S16, the flow advances from step S5 to step S10. That is, in step S10, the pilot pressure PL for the normal state defined in Equation (8) is set as an alternative to the pilot pressure Pr which has been determined in Equation (9) for the period during the speed change operation. That is, if the time lapse t2 from the time at which the deduction of the completion of the speed change operation has been made (F=1) to the present time is shorter than the time lapse $T_0$ from the deduction of the completion of the speed change operation, the control in which the line pressure PL is reduced is cancelled in order to prevent the slip in the frictional engagement elements due to the fact that the line pressure PL has been lowered. The slip of the frictional engagement elements can be prevented by returning the line pressure to the normal value (PL shown in Equation (8)) which is not the value for the period during the speed change operation. Therefore, the acceleration can be performed.

Completion Prediction of Speed Change Operation

Then, the operation for deducing the completion of the speed change operation shown in step S12 shown in FIG. 5A will be described with reference to a flow chart shown in FIG. 5B.

First, in step S21, it is determined whether or not the time period t1 from the speed change operation start (the counting of the above-described time lapse has been started in step S6) and predetermined time period TMAX determined for the purpose of unconditionally making the deduction of the completion of the speed change operation hold the following relationship:

$$T1 > TMAX \qquad (12)$$

The above-described condition is the condition ① described in "Schematic Description of the Line Pressure Control". If Equation (12) is met, the flow advances to step S48 in which the flag F is set, where TMAX is the maximum time period which is estimated to be taken for the speed change operation. Even if the completion of the speed change operation on the basis of the turbine revolution NT or the like cannot be made, there is no problem to make the deduction of the completion of the speed change operation after the above-described time has passed.

In step S22, it is determined whether or not the turbine revolution NT has been lowered than NMIN. If it has been determined NT is lower than NMIN, it arises no problem to make the deduction of the completion of the speed change operation, where NMIN is the condition ② described in "Schematic Description of the Line Pressure Control", the level of it being 320 rpm according to this embodiment.

In step S23, it is determined whether or not the turbine revolution has not been changed from the speed change start, that is, whether or not the maximum value ΔNMX of the change ratio of NT is zero. Namely, it is detected that the lowering or rising of the turbine revolution has been started by detecting the time at which the maximum value ΔNMX of the change ratio of NT becomes a value except for zero as shown in FIGS. 6A and 6B. Therefore, since an error can be easily taken place in the deduction of the completion of the speed change operation when ΔNMX is zero, the flow advances to step S47 in which flag F is set to zero.

Steps S24 through S44 are steps in which the condition ③ described in "Schematic Description of the Line Pressure Control" is examined. That is, in steps S24 through S34, the deduction of the completion of the speed change operation is made when the up shift has been detected, while the same is made in steps S35 through S44 when the down shift has been detected. As described in the "Schematic Description of the Line Pressure Control", the deduction of the completion of the speed change operation is made when the turbine revolution NT has entered the "determination range" (P2=1) shown in FIG. 6 and then the turbine revolution NT has been rapidly changed, or when the turbine revolution NT has been converged into a predetermined revolution (P1=1), that is, when (P1=1) and (P2=1). Furthermore, when the turbine revolution NT has exceeded the "determination range" described with reference to FIGS. 6A and 6B and then it is lowered/raised by a certain degree (P3=1), it is forcibly deduced that the speed change operation has been completed.

Since the deduction of the completion of the speed change operation is common to both the up shift operation and the down shift operation, the deduction at the time of the up shift operation will be described with reference to the control procedure shown in FIG. 5B.

The relationship P1=1 is realized in step S26 when it has been determined in step S25 that:

$$\left| \frac{\Delta N}{\Delta_{MAX}} \right| \leq 0.5$$

or when $$\left| \frac{\Delta N}{\Delta_{MAX}} \right| > 0.5$$

and simultaneously when the following determination is made in step S27):

$$\Delta N \geq 0$$

In steps S29 through S31, whether or not NT has entered the "determination range" shown in FIG. 6A is examined. That is, if it is determined, in step S29, that the following relationship is held, $$NT \leq NT0$$

then P2 becomes P2=1 In step S45, it is determined whether or not the abovedescribed two conditions for P1 and P2 are simultaneously satisfied. In this case, the flow advances to step S48 in which the flag F is set to "1".

In the case where both P1 and P2 do not become "1", it is determined that P3=1 if NT has exceeded the "determination range" (NT≦NTN in step S32). Then, the flag F is forcibly set in step S48.

Although the description is made about the up shift operation in steps S25 through S34, the similar operations are made in steps S35 through S44 for the down shift operation which corresponds to steps S25 to S44. However, in the case of the down shift operation, the turbine revolution NT is raised due to the speed change operation. Therefore, the direction of the inequality sign in steps S35, S37, S39 and S42 becomes opposite to that in the up shift operation.

Advantages

Therefore, according embodiment of the line pressure controller, the following advantages can be obtained:

A1: As shown in the flow chart shown in FIG. 5B, the deduction of the substantial completion of the speed change operation is made on condition (condition P2) that the turbine revolution has entered a predetermined "determination range". Furthermore, the above-described deduction is made only after the turbine revolution has been changed (ΔNMX=0). As a result, the deduction of the completion of the speed change operation is performed accurately. A2: In the case where the accelerating operation performed by a driver has been detected in a time period To in which the completion of the speed change operation is confirmed after the substantial completion of the speed change operation has been determined accurately, the line pressure Pr=h (DPT, R, TV, NT) in the hydraulic circuit in the automatic transmission 10 which has been temporarily reduced is returned to the original level Pr=g (R, TV, NT). That is, the line pressure is raised. Therefore, slip in the torque converter can be prevented. That is, the acceleration feeling corresponding to the operation of the accelerator pedal can be obtained.

A various modification within the thesis of the present invention may be performed.

For example, although the labiniyo type transmission is employed according to the above-described embodiment, the present invention is not limited to the above-described type.

The method of detecting the engine load is not limited to the structure in which the throttle opening degree TV is employed. For example, it may be determined depending upon the negative pressure level in the suction pipe, the engine revolution or the quantity of the sucked air.

Furthermore, the deduction of the completion of the speed change operation is not limited to the method in which the turbine revolution is employed. For example, it may be made depending upon the engine revolution.

The present invention is not limited to the above embodiments and various changes and modifications can be made within the spirit and scope of the present invention. Therefore, to apprise the public of the scope of the present invention the following claims are made.

What is claimed is:

1. A line pressure controller for an automatic transmission having a hydraulic pressure supply circuit for supplying line pressure to frictional engaging elements which are arranged to be engaged/disengaged so as to change the speed; and regulation means for regulating said line pressure, said controller comprising:
    load detection means for detecting the engine load;
    start detection means for detecting the start of the speed change operation performed in said automatic transmission;
    completion detection means for detecting the substantial completion of said speed change operation performed by said automatic transmission;
    time supervisory means which receives the output from said completion detection means for supervising a predetermined lapse of time period after said substantial completion of said speed change operation has been detected; and
    first and second control means for compensating-/controlling said line pressure, wherein said first control means receives the output from said completion detection means and from said time supervisory means so as to control said regulation means in such a manner that said line pressure is lowered after said predetermined lapse of time period from the start of the operation for changing the engaging state of said frictional engagement elements to said substantial completion of said speed change operation; and said second control means receives the output from said completion detection means, from said time supervisory means and from said load detection means so as to control said regulation means in such a manner that said line pressure lowering control performed by said first control means is cancelled and said line pressure is raised if said engine load has been enlarged by a predetermined value after said predetermined lapse of time after said substantial completion of said speed change operation.

2. The controller according to claim 1, wherein said second control means raises, at the present shift position, said line pressure up to a level which is for a case in which said hydraulic pressure supply circuit is in a normal state.

3. The controller according to claim 1, wherein said completion detection means comprises:
    means for detecting turbine revolution NT of said automatic transmission;
    means for setting a turbine revolution range which serves as a reference for making the determination of said substantial completion of said speed change operation; and
    means for detecting the time at which NT has been rapidly changed in a time period in which NT has entered said range, wherein
    the time at which NT has been rapidly changed is regarded as the substantial completion time of said speed change operation.

4. The controller according to claim 1, wherein said completion detection means comprises:
    means for detecting turbine revolution NT of said automatic transmission;
    means for setting a turbine revolution range which serves as a reference for making the determination of said substantial completion of said speed change operation; and
    means for detecting the time at which NT is not substantially changed in a time period in which NT has entered in said range, wherein
    the time at which NT has not been substantially changed is regarded as the substantial completion time of said speed change operation.

5. The controller according to claim 1, wherein said second control means determines that said engine load has been enlarged by a predetermined value depending upon a fact that there is a considerably large load change with respect to the engine load at the time at which said start detection means has detected the start of said speed change operation performed in said automatic transmission.

6. The controller according to claim 1, wherein said engine load detection means detects said load in accordance with the throttle opening degree of the engine of a vehicle provided with said automatic transmission.

* * * * *

UNITED STATES PATENT AND TRADEMARK OFFICE
CERTIFICATE OF CORRECTION

PATENT NO. : 5,086,669  
DATED : February 11, 1992  
INVENTOR(S) : FUJIWARA et al.

It is certified that error appears in the above-identified patent and that said Letters Patent is hereby corrected as shown below:

Col. 1, line 58, "To" s/b --$T_0$--.

Col. 2, line 4, "abovedescribed" s/b --above-described--;  
line 12, "To" s/b --$T_0$--;  
line 58, after 'mission" insert --according--;  
line 60, after "chanical" insert --structure of--;  
line 68, after "control" insert --procedure--.

Col. 3, line 39, after "(low)" insert --through--.

Col. 5, line 25, "s" s/b --so--.

Col. 7, line 3, delete "a";  
line 7, "to" s/b --through--;  
line 8, "to" s/b --through--;  
line 13, "to" s/b --through--;  
line 15, "to" s/b --through--;  
line 25, "to" s/b --through--.

Col. 8, line 14, after "via" insert --a--.  
line 14, "and a a" s/b --and a--.

Col. 10, line 33, after "97d" insert --respectively--;  
line 48, after "off)." insert --The line 142 is disconnected at the low speed in the 1-range in which the pilot pressure is introduced into the --;  
line 51, after "2-range" insert "and at the second speed in the 1-range in which the pilot--.

UNITED STATES PATENT AND TRADEMARK OFFICE
CERTIFICATE OF CORRECTION

PATENT NO. : 5,086,669

DATED : February 11, 1992

INVENTOR(S) : FUJIWARA et al.

It is certified that error appears in the above-identified patent and that said Letters Patent is hereby corrected as shown below:

Col. 11, line 28, "To" s/b --$T_0$--;
        line 30, "To" s/b --$T_0$--;
        line 33, "To" s/b --$T_0$--;
        line 34, "S" s/b --so--;
        line 47, "⊕" s/b --$\delta$--.

Col. 12, line 11, "NTS" s/b --$N_{TS}$--;
        line 13, "NTN" s/b --$N_{TN}$--;
        line 16, "NTN" s/b --$N_{TN}$--;
        line 17, "NTS" s/b --$N_{TS}$--;
        line 19, "NTS" s/b --$N_{TS}$--;
        line 20, "NTN" s/b --$N_{TN}$--;
        line 21, "NTS" s/b --$N_{TS}$--;
        line 22, "NTN" s/b --$N_{TN}$--;
        line 24, "NT" s/b --$N_T$--;
        line 25, "NTN" s/b --$N_{TN}$--;
        line 26, "NT" s/b --$N_T$--;
        line 27, "NTO" s/b --$N_{TO}$--;
        line 28, "NT" s/b --$N_T$--;

Equation (1): "NTO = NTN + 0.25 (NTS-NTN)" s/b --$N_{TO} = N_{TN} + 0.25(N_{TS} - N_{TN})$--;
        line 35, "NTS>NTN" s/b --$N_{TS} N_{TN}$--;
        line 36, "NTS<NTNN" s/b --$N_{TS} < N_{TN}$--;
        line 42, "NT" s/b --$N_T$--; and "NTO" s/b --$N_{TO}$--;
        line 43, "NTN" s/b --$N_{TN}$--;

UNITED STATES PATENT AND TRADEMARK OFFICE
CERTIFICATE OF CORRECTION

PATENT NO. : 5,086,669
DATED : February 11, 1992
INVENTOR(S) : FUJIWARA et al.

It is certified that error appears in the above-identified patent and that said Letters Patent is hereby corrected as shown below:

Equation (2):     "NTN<NT≦NTO" s/b --$N_{TN}<N_T\leq N_{TO}$--;
    Equation (3):     "NTO≦NT<NTN" s/b --$N_{TO}\leq N_T<N_{TN}$--;
        line 55,    "NR" s/b --$N_T$--;
        line 58,    "NT" s/b --$N_T$--.

Col. 13,  line 11,    ΔNMX" s/b $\Delta N_{MX}$--;
        line 12,    "NT" s/b --$N_T$--;
        line 22,    "NT" s/b --$N_T$--;
        line 24,    "NT" s/b --$N_T$--;
        line 28,    "NT" s/b --$N_T$--;
        line 31,    "NT" s/b --$N_T$--;
        line 53,    "NT" s/b --$N_T$--;

Col. 14,  line 3,     "NT" s/b --$N_T$--;
        lines 5,6,7&11 "SP1" s/b --$SP_1$--;
        line 13,    "SP1" s/b --$SP_1$--, and "SP0" s/b --$SP_0$--;
        line 14,    "SP1" s/b --$SP_1$--;
  after line 17,    "SP1 = SP0" s/b --$SP_1 = SP_0$--;
        line 22,    "PL" s/b --$P_L$--;

Equation (8):     "PL = g (R, TV, NT)" s/b --$P_L = g(R, TV, N_T)$--;
        lines 27 and 28 after equation (8), "PL" s/b --$P_L$--;
        line 35,    "SP1" s/b --$SP_1$--;
        line 39,    "SP0" s/b --$SP_0$--;
        line 40,    "SP1" s/b --$SP_1$--;
  after line 41,    "SP1 = SP0" s/b --$SP_1 = SP_0$--;
        line 50,    "T1" s/b --$t_1$--;

UNITED STATES PATENT AND TRADEMARK OFFICE
CERTIFICATE OF CORRECTION

PATENT NO. : 5,086,669

DATED : February 11, 1992

INVENTOR(S) : FUJIWARA et al.

It is certified that error appears in the above-identified patent and that said Letters Patent is hereby corrected as shown below:

```
           line 51,     "form" s/b --from--;
           line 53,     "SP0" s/b --SP₀--;
           line 54,     "SP1" s/b --SP₁--;
           line 57,     "SP0" s/b --SP₀--;
           line 59,     "PL" s/b --P_L--;
           line 60,     "PL" s/b --P_L--;
           line 64,     "NT" s/b --N_T--;
   Equation (9):        "PL = h(ΔPT, R, TV, NT)" s/b --P_L = h(ΔPT,
                        R, TV, N_T)--.

Col. 15,   line 1,      "PL" s/b --P_L--;
           line 3,      "PL" s/b --P_L--;
           line 23,     "NT" s/b --N_T--;
           line 41,     "t2" s/b --t₂--;
           line 48,     "NT" s/b --N_T--;
           line 49,     "0" s/b --T₀--;

Equation (10):       "TV - TV0≦δ" s/b --TV - TV₀≦δ--;
           line 65,     "P" s/b --P_L--;
           line 68,     "t2" s/b --t₂--, and "t2T" s/b --t₂ T--.

Col. 16,   line 4,      "SP1" s/b --SP₁--;
           line 5,      "SP0" s/b --SP₀--;
   Equation (11):       "TV - TV0≦δ" s/b --TV - TV₀≦δ--;
   after   line 20,     "SP0 = SP1" s/b --SP₀ = SP₁--;
           line 25,     "SP0=SP1" s/b --SP₀=SP₁--;
           line 27,     "PL" s/b --P_L--;
           line 29,     "Pr" s/b --P_L--;
           line 31,     "t2" s/b --t₂--;
```

UNITED STATES PATENT AND TRADEMARK OFFICE
CERTIFICATE OF CORRECTION

PATENT NO. : 5,086,669
DATED : February 11, 1992
INVENTOR(S) : FUJIWARA et al.

It is certified that error appears in the above-identified patent and that said Letters Patent is hereby corrected as shown below:

line 38, "PL" s/b --$P_L$--;
      line 53, "t1" s/b --$t_1$--;
      line 60, "T1>TMAX" s/b --$t_1 > T_{MAX}$--;
      line 65, "TMAX" s/b --$T_{MAX}$--.

Col. 17, line 1, "NT" s/b --$N_T$--;
      line 6, "NT" s/b --$N_T$--, and "NMIN" s/b --$N_{MIN}$--;
      line 7, "NT" s/b --$N_T$--, and "NMIN" s/b --$N_{MIN}$--;
      line 9, "NMIN" s/b --$N_{MIN}$--;
      line 16, "ΔNMX" s/b --$\Delta N_{MX}$--, and "NT" s/b --$N_T$--;
      line 19, "ΔNMX" s/b --$\Delta N_{MX}$--, "NT" s/b --$N_T$--;
      line 20, "ΔNMX: s/b --$\Delta N_{MX}$--;
      line 35, "NT" s/b --$N_T$--;
      line 37, "NT" s/b --$N_T$--;
      line 38, "NT" s/b --$N_T$--;
      line 39, "P1" s/b --$P_1$--;
      line 40, "P2" s/b --$P_2$--, and "NT" s/b --$N_T$--;
      line 43, "P3" s/b --$P_3$--;
      line 67, "NT" s/b --$N_T$--.

Col. 18,
  after line 2, "NT≤NTØ" s/b --$N_T \leq N_{T0}$--;
      line 6, "P2" s/b --$P_2$-- (both occurrences);
      line 7, "abovedescribed" s/b --above-described--;
      line 8, "P1 and P2" s/b --$P_1$ and $P_2$--;
      line 11, "P1 and P2" s/b --$P_1$ and $P_2$--;
      line 12, "NT" s/b --$N_T$--;
      line 13, "(NT≤NTN)" s/b --$N_T \leq N_{TN}$--;
      line 20, "NT" s/b --$N_T$--;

UNITED STATES PATENT AND TRADEMARK OFFICE
CERTIFICATE OF CORRECTION

PATENT NO. : 5,086,669
DATED : February 11, 1992
INVENTOR(S) : FUJIWARA et al.

It is certified that error appears in the above-identified patent and that said Letters Patent is hereby corrected as shown below:

line 35, "($\Delta$NMX = 0)" s/b --($\Delta N_{MX}$ = 0)--;
    line 39, "To" s/b --$T_0$--;
    line 42, "Pr" s/b --$P_L$--;
    line 43, "NT" s/b --$N_T$--;
    line 45, "Pr" s/b --$P_L$--;
    line 46, "NT" s/b --$N_T$--.

Col. 19, line 33 (claim 1), after "and" begin new paragraph.

Col. 20, lines 6, 12, 13, 15 (claim 3), each occurrence of "NT" s/b --$N_T$--;
lines 20, 26, 27, 29 (claim 4), each occurrence of "NT" s/b --$N_T$--.

Signed and Sealed this

Twenty-third Day of November, 1993

BRUCE LEHMAN

Attest:

Attesting Officer      Commissioner of Patents and Trademarks